United States Patent
Anwar et al.

(10) Patent No.: US 6,871,919 B2
(45) Date of Patent: *Mar. 29, 2005

(54) METHOD AND APPARATUS FOR POWER MANAGEMENT OF A BRAKING SYSTEM

(75) Inventors: Sohel Anwar, Canton, MI (US); Carl David Klaes, Livonia, MI (US); Kevin J Pavlov, Livonia, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/644,713

(22) Filed: Aug. 20, 2003

(65) Prior Publication Data

US 2004/0070269 A1 Apr. 15, 2004

Related U.S. Application Data

(60) Provisional application No. 60/404,680, filed on Aug. 20, 2002.

(51) Int. Cl.⁷ .............................. G60T 8/64; G06F 7/00
(52) U.S. Cl. ........................................ 303/152; 701/22
(58) Field of Search ................................ 188/156–164; 303/20, 151, 152, 155; 701/70, 93, 22; 180/65.1–65.7

(56) References Cited

U.S. PATENT DOCUMENTS

| | | | |
|---|---|---|---|
| 3,963,372 A | | 6/1976 | McLain et al. |
| 4,326,236 A | * | 4/1982 | McNair et al. ............. 361/170 |
| 4,719,861 A | | 1/1988 | Savage et al. |
| 5,050,936 A | | 9/1991 | Tanaka et al. |
| 5,362,135 A | | 11/1994 | Riddiford et al. |
| 5,615,933 A | | 4/1997 | Kidston et al. |
| 5,734,238 A | | 3/1998 | Yanagisawa et al. |
| 5,751,137 A | | 5/1998 | Kiuchi et al. |
| 5,788,597 A | | 8/1998 | Boll et al. |
| 5,839,800 A | | 11/1998 | Koga et al. |
| 5,857,755 A | | 1/1999 | Aoki et al. |
| 5,867,009 A | | 2/1999 | Kiuchi et al. |
| 5,910,722 A | | 6/1999 | Lyons et al. |
| 5,941,328 A | | 8/1999 | Lyons et al. |
| 6,021,365 A | | 2/2000 | Ishii et al. |
| 6,086,166 A | | 7/2000 | Fukasawa |
| 6,116,368 A | | 9/2000 | Lyons et al. |
| 6,120,115 A | | 9/2000 | Manabe |
| 6,122,587 A | | 9/2000 | Takahara et al. |
| 6,122,588 A | | 9/2000 | Shehan et al. |
| 6,179,395 B1 | | 1/2001 | Schneider |
| 6,216,808 B1 | | 4/2001 | Kuno et al. |
| 6,231,134 B1 | | 5/2001 | Fukasawa et al. |
| 6,231,135 B1 | | 5/2001 | Bower et al. |
| 6,244,674 B1 | | 6/2001 | Kuno et al. |
| 6,702,404 B2 | * | 3/2004 | Anwar et al. ............... 303/152 |
| 2004/0035656 A1 | * | 2/2004 | Anwar et al. ............... 188/161 |

FOREIGN PATENT DOCUMENTS

| | | | |
|---|---|---|---|
| EP | 0 867 323 A2 | 3/1998 | |
| EP | 0 901 930 A1 | 9/1998 | |
| JP | 10248299 A | * 9/1998 | ........... H02P/15/00 |

* cited by examiner

Primary Examiner—Xuan Lan Nguyen
(74) Attorney, Agent, or Firm—Brinks Hofer Gilson & Lione

(57) ABSTRACT

A vehicle braking system and method of control is disclosed which includes electromagnetic and friction braking functionality. The electromagnetic braking system includes a generator which supplies power to eddy current devices. Accordingly, the eddy current devices apply a retarding torque on the wheels of the vehicle. In the event the generator is unable to supply a predetermined amount of power to eddy current devices, friction braking is activated thereby enhancing braking performance.

17 Claims, 5 Drawing Sheets

US 6,871,919 B2

METHOD AND APPARATUS FOR POWER MANAGEMENT OF A BRAKING SYSTEM

CROSS REFERENCE TO RELATED APPLICATIONS

This application claims priority of provisional patent application Ser. No. 60/404,680 filed Aug. 20, 2002.

STATEMENT REGARDING FEDERALLY SPONSORED RESEARCH

Not Applicable.

BACKGROUND OF THE INVENTION

1. Field of the Invention

The present invention relates in general to a vehicle braking system, and, more specifically, to a power management system for a vehicle braking system having electromagnetic and friction braking.

2. Description of the Related Art

Hybrid braking systems for vehicles are well known. These braking systems usually include electromagnetic and friction braking capabilities. The use of electromagnetic braking improves efficiency in vehicles by recovering kinetic energy produced by the vehicle with an electric machine wherein the electric machine generates electric energy that is applied to electromagnetic retarders (also referred to as eddy current devices) within the braking system. In some instances, the electric machine is unable to generate a desired amount of braking energy in which to stop the vehicle. When this occurs, prior art braking systems have disclosed methods of compensating for the inadequacy of the electromagnetic brakes by utilizing the friction braking capabilities. However, these prior art systems have proved to be largely inefficient and the system transitions from electromagnetic braking to friction braking and vice versa are noticeable to the vehicle operator.

Prior art systems have been subject to low braking forces during the initial phase of braking from the eddy current devices. The present inventors have discovered that this deficiency results from the electric machines being inadequately powered up during that time. For example, when the vehicle operator first depresses the brake pedal and excitation current energizes the electric machine, the speed dependent characteristics of the electric machine prevents the generation of an adequate amount of power for the braking system which renders the electromagnetic braking functions inadequate.

It would therefore be desirable to provide a hybrid braking system that efficiently distributes the energy generated within the braking system, utilizes a supplemental power source for the eddy current devices when the electric machine is unable to generate an adequate amount of power, and provide a seamless braking feel to the vehicle operator.

SUMMARY OF THE INVENTION

The present invention overcomes the disadvantages of the prior art approaches by providing an apparatus and a method of controlling power for a braking system, which permits use of electromagnetic and friction braking.

Accordingly, the braking system is for a vehicle having at least one wheel and at least one battery capable of receiving and supplying power. The system includes a battery switch which selectably couples the battery to a plurality of eddy current devices over a power rail. The power rail provides a connection point between the generated power and the electromagnetic brakes. The eddy current devices provide a retarding torque to a wheel of the vehicle when energized. The system also includes a brake pedal having a brake pedal sensor attached thereto, wherein the brake pedal sensor senses the position of the brake pedal. A generator which is driven by motion of the vehicle is included. The generator, having an excitation winding and output winding, supplies power to the eddy current devices and the battery when the brake pedal sensor senses that a vehicle operator has placed the brake pedal in a predetermined pedal position. The predetermined pedal position occurs when the brake pedal is in a depressed position. The apparatus includes a controller having memory storage capability which stores an actual power output of the generator, an elapsed energization time, a predetermined ramp time, and a predetermined power requirement of the eddy current devices. In addition, the controller receives inputs from the power module, the brake pedal sensor and the generator, monitors and stores the voltage of the generator and the battery. The controller generates signals for the battery switch to couple the battery to the eddy current machines over the power rail based on memory storage and in response to inputs from the brake pedal sensor, the eddy current devices, and the generator.

The present invention further includes a method of control for the braking system comprising the steps of energizing the generator by applying an electric current to the excitation winding when the vehicle is in motion and the brake pedal is depressed. The method includes the step of coupling the battery to the eddy current devices during an initial power interval after energizing the generator. The step of decoupling the battery from the eddy current devices is included at the end of the initial power interval. The controller compares the generator output voltage to the battery voltage during a second power interval and after the initial power interval. When the generator output voltage is less than the battery voltage, the friction brakes are activated along with the eddy current brakes for as long as the brake pedal is pressed. The method includes the step of coupling the generator to the battery during the second power interval for as long as the generator voltage is greater than the battery voltage.

An additional method is included in the present invention comprising the steps of energizing the generator by applying an electric current to the generator excitation winding such that current is generated in the output windings when the vehicle is in motion. The method couples the battery to the eddy current devices during an initial power interval. Furthermore, the method includes the step of determining a predetermined power requirement during the second power interval and calculating an actual power output of the generator. The actual power output of the generator is based on a voltage applied to the generator, the wheel speed, a brake pedal signal based on the position of a brake pedal, and a braking feed back signal. When the actual power output of the generator is less than the predetermined power requirement the method generates a fault signal for the vehicle operator. The method includes the step of decoupling the battery from the eddy current devices when the actual power output is greater than the predetermined power requirement. Next, the method detects the end of the second power interval and couples the battery to the eddy current devices when the end of the second power interval is detected.

These and other advantages, features and objects of the present invention will become apparent from the drawings, detailed description and claims which follow.

DETAILED DESCRIPTION OF PREFERRED EMBODIMENTS

Figure 1:
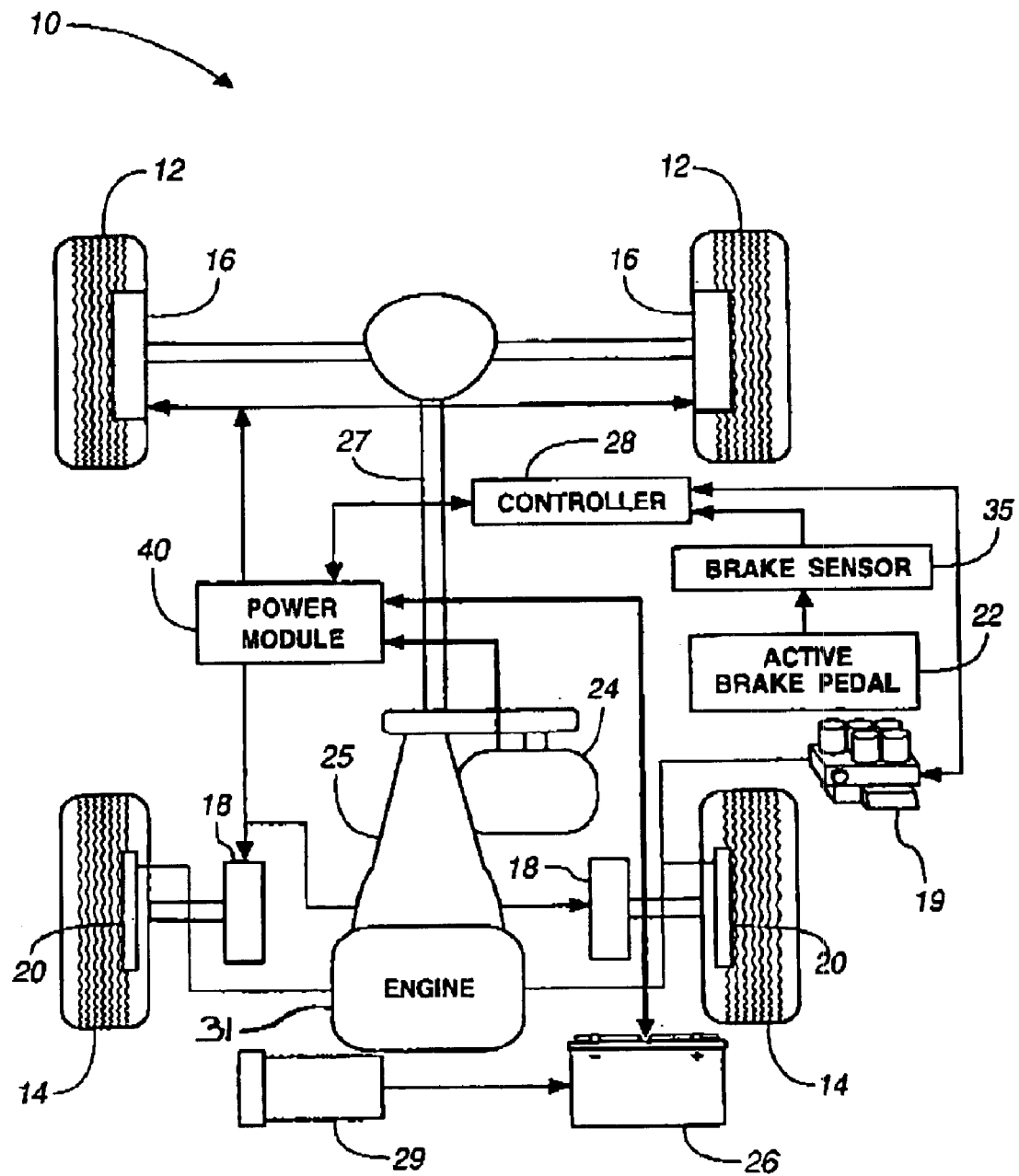
FIG. 1 is a hardware diagram of a motor vehicle having an electromagnetic and friction braking system according to the present invention.

Referring to FIG. 1, an electromagnetic and friction braking system 10 for a vehicle is illustrated which includes left and right rear wheels 12 and left and right front wheels 14. The front wheels 14 have respective hydraulic friction brakes 20 coupled thereto. An active brake pedal 22 is coupled to a brake pedal sensor wherein the brake pedal sensor generates a braking demand signal for a controller 28. The electromagnetic and friction braking system 10 is actuated when the brake pedal 22 is placed in a predetermined pedal position by a vehicle operator. Preferably, the predetermined pedal position occurs when the brake pedal 22 is in a depressed position. The front and rear wheels 14 and 12 are coupled to front and rear eddy current devices 18 and 16. In a preferred embodiment, there are four eddy current devices wherein each wheel has an eddy current device connected thereto. The front and rear eddy current devices 18 and 16 are electromagnetic retarders which produce a braking force in the form of a retarding torque on the front and rear wheels 12 and 14 when energized. The front eddy current devices 18 are mounted on a sprung mass with the chassis of the vehicle. The rear eddy current devices 16 are mounted on the rear wheel hubs.

A power module 40 is electrically coupled to the battery 26, the front and rear eddy current devices 18 and 16, a generator 24, and controller 28. The power module 40 receives signals from the controller 28 and generates signals for the front and rear eddy current devices 18 and 16. The generator 24 is mounted on the end of a transmission 25 and coupled to a drive shaft 27. The generator 24 is preferably a three-phase synchronous brush type having an excitation and output windings. An alternate embodiment of the generator 24 is a three-phase brushless hompolar type. The generator 24 supplies power to the front and rear eddy current devices 18 and 16. The generator 24 is also capable of supplying power to a battery 26 when a brake pedal sensor 35 senses that the vehicle operator has placed the brake pedal 22 in a predetermined brake pedal position and that the vehicle speed has reached a predetermined value. The operating voltage of the generator 24 is about 42 volts. An alternator 29 is driven by engine 31 and charges the battery 26. The battery 26 is coupled to power module 40 for supplying power to the front and rear eddy current devices 18 and 16 to enhance braking performance or when the generator 24 does not produce an adequate amount of power for the front and rear eddy current devices 18 and 16. The battery 26 preferably has a voltage of thirty-six volts and is chargeable up to forty-two volts.

The brake pedal sensor 35 senses the position of the brake pedal 22 and generates a brake pedal position signal for the controller 28. The controller 28 stores in memory an actual power output of the generator 24 based on the amount of voltage and current produced. The controller 28 also stores in memory an elapsed energization time, a predetermined ramp time, and a predetermined power requirement of the front and rear eddy current devices 18 and 16. The elapsed energization time is the elapsed time since the vehicle operator has made a braking demand, i.e., pressed the brake pedal. The predetermined ramp time is the amount of time required for the generator 24 to respond to pressing of the brake pedal 22 (i.e., the time required for the excitation field to reach its desired value so that the generator produces a desired voltage). During the predetermined ramp time, the battery 26 will supply power to the eddy current devices 16 and 18. The predetermined power requirement of the front and rear eddy current devices 18 and 16 is the amount of power required by the front and rear eddy current devices 18 and 16 as determined by the controller 28 based on the brake demand. In the event that brake demand is not fully satisfied when eddy current devices 16 and 18 are at full capacity, friction braking is used to provide a supplemental braking force. When the friction brake 20 is activated, the controller 28 generates a control signal for a driver module 19. The driver module 19 controls the amount of hydraulic pressure within the friction brake system. In response to the control signal from the controller 28, the driver module 19 activates hydraulic pumps and valves within the friction brake system to either increase or decrease the level of hydraulic pressure.

Figure 2:
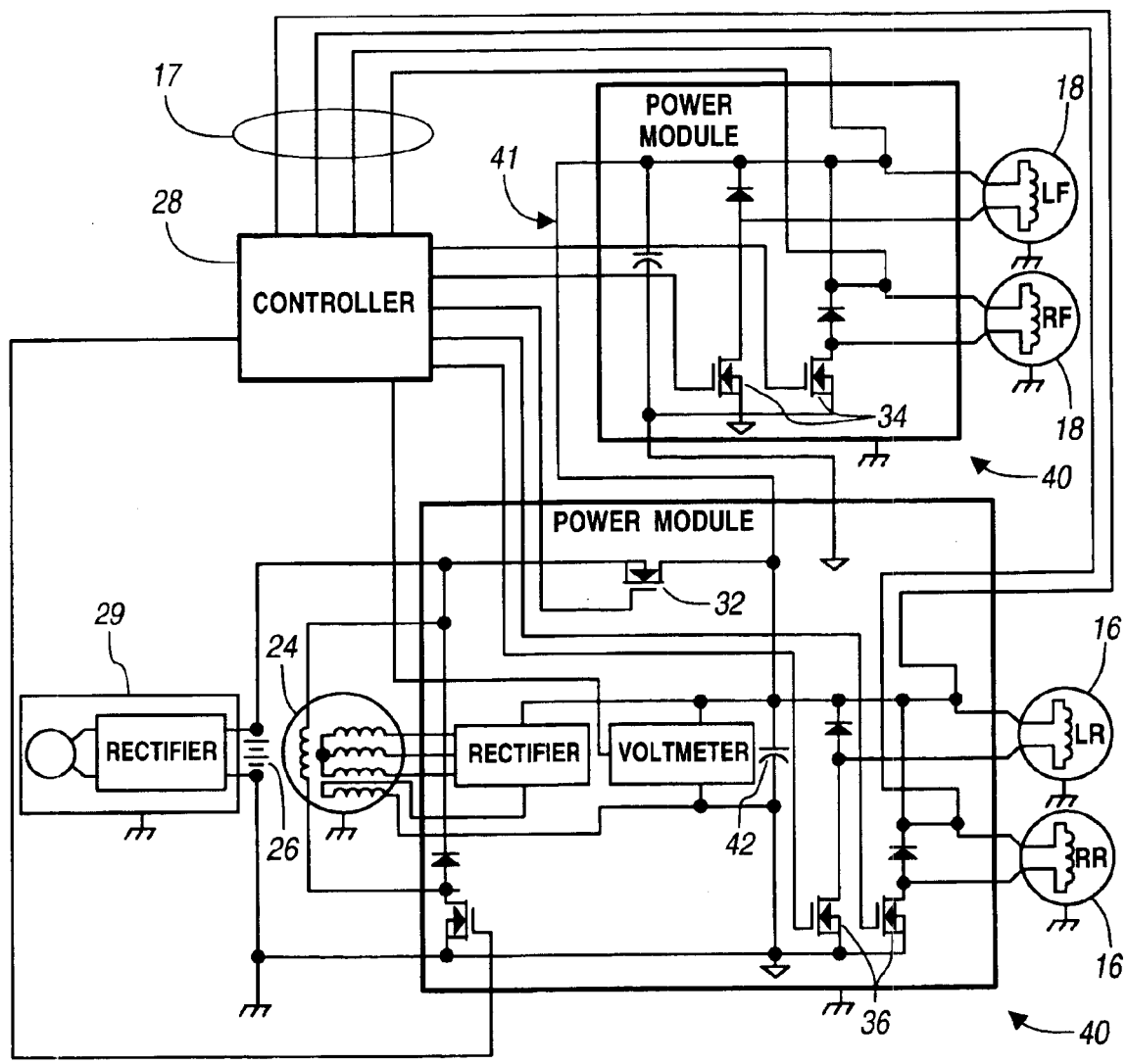
FIG. 2 is an electrical schematic of an electromagnetic braking system according to the present invention.

In FIG. 2, there is illustrated an electrical schematic for the electromagnetic and friction braking system 10. The power module 40 includes front and rear eddy current switches 34 and 36 (which may be separated into two separate submodules, as shown). The controller 28 generates signals for the power module 40. Preferably, the signals generated for the power module 40 are pulse-width-modulated.

Figure 5:
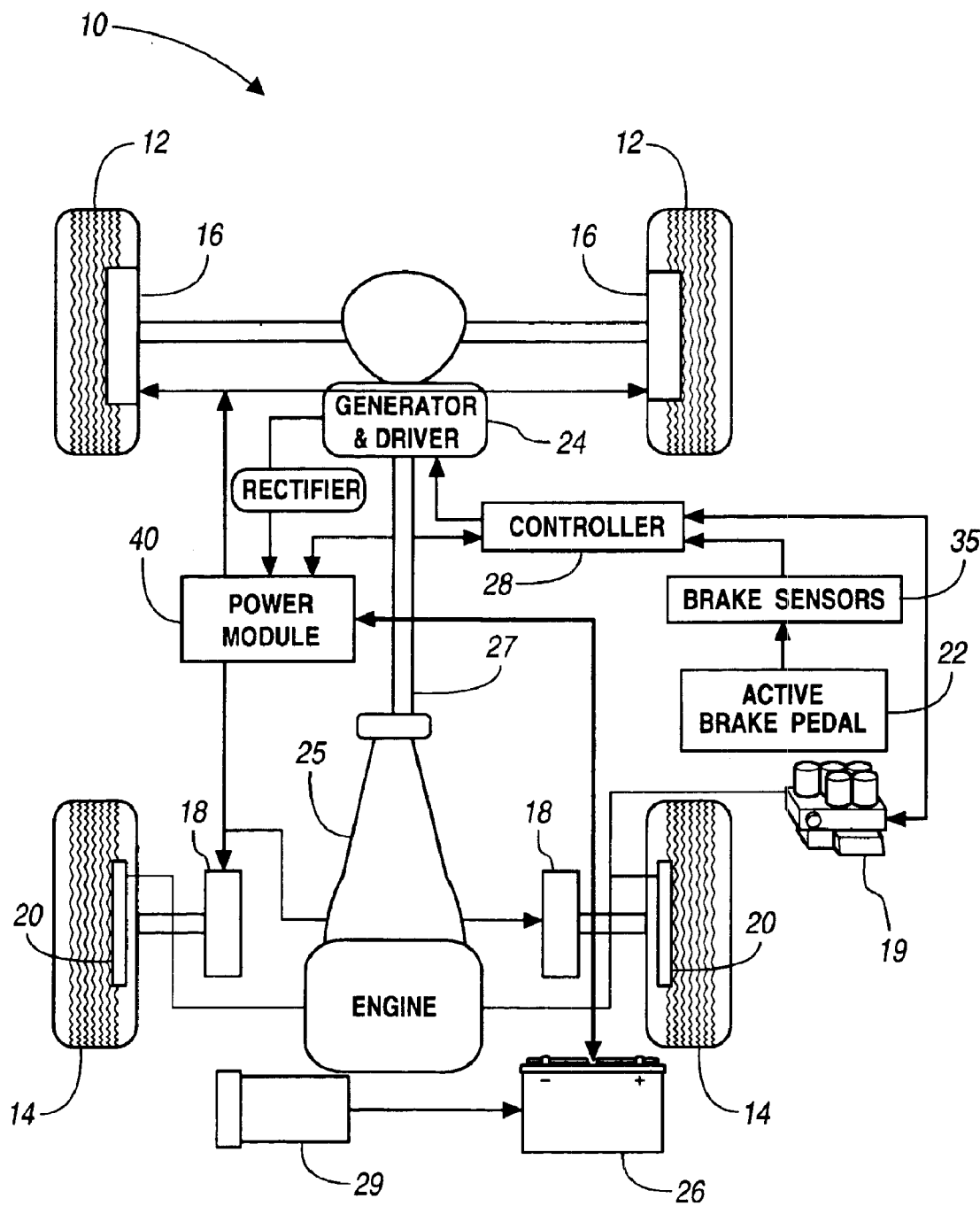
FIG. 5 is a hardware diagram of a motor vehicle having an electromagnetic and friction braking system according to the present invention.

As the generator 24 generates power, the output is rectified and applied to a capacitor 42. The capacitor 42 stabilizes the rectified output of the generator 24. When the battery switch 32 is closed the battery 26 supplies power to a power rail 41. The power rail 41 is a voltage summing junction for the generator 24 and the battery 26. The power rail 41 provides the electrical connection between the battery switch 32 and the front and rear eddy current devices 18 and 16. After the power module 40 recieves signals from the controller 28, either the generator 24 or the battery 26 energizes the front and rear eddy current devices 18 and 16. The controller 28 monitors the current draw of the front and rear eddy current devices 18 and 16 by receiving a braking feed back signal over a power line 17. A voltmeter enables the controller 28 to monitor the rectified output voltage of the generator 24. FIG. 5 illustrates an alternate configuration of the electromagnetic and friction braking system 10.

Figure 3:
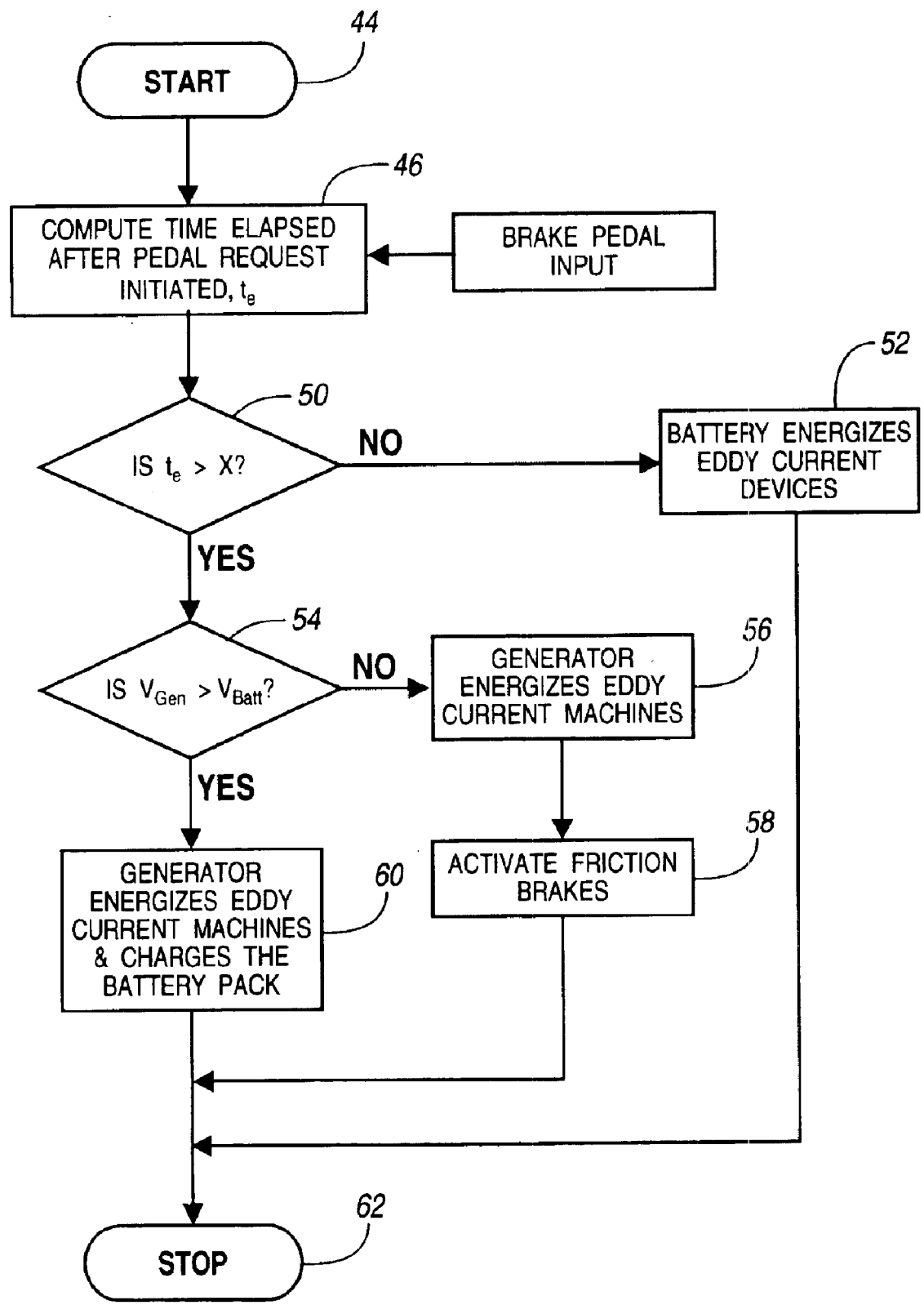
FIG. 3 is a flow chart illustrating a normal mode of operation for an electromagnetic and friction braking system according to the present invention.

In FIG. 3, there is illustrated a flow chart of the normal mode of power management for the electromagnetic and friction braking system 10. In the normal mode of power management, the battery 26 supplies power to the front and rear eddy current devices 18 and 16 for a predetermined ramp time until the output of generator 24 reaches a specified threshold. The ramping up of generator output results from the time it takes for the excitation field to build up after the excitation winding is energized. In one embodiment, the predetermined ramp time for the generator 24 is less than about 200 milliseconds. When the vehicle travels at low speeds, the generator 24 is unable to produce a sufficient amount of power for the front and rear eddy current devices 18 and 16. As previously noted, the generator 24 is mounted on the vehicle driveline and accordingly generates power only when the vehicle is in motion. The amount of power required to energize the front and rear eddy current devices 18 and 16 is not available until the vehicle reaches a specified speed (even after the build up of the excitation field). Once the vehicle has reached the specified speed, the generator 24 is capable of supplying adequate power to the front and rear eddy current devices 18 and 16. Accordingly, the battery 26 is no longer needed for supplying power to the front and rear eddy current devices 18 and 16 after the elapsed time exceeds the predetermined ramp time. Hence, the generator 24 becomes the primary source of power during the normal mode of operation after the ramp time.

The method of FIG. 3 begins at step 44. In step 46, the controller 28 computes the elapsed energization time ($t_e$) based on the amount of time elapsed after the vehicle operator has made a braking demand, e.g., pressed the brake pedal 22. In step 50, the controller 28 compares the elapsed energization time to the predetermined ramp time (X) which defines an initial power interval. If the elapsed energization time is less than the predetermined ramp time, then the battery 26 is coupled to the eddy current devices in step 52 as the primary source of power for the front and rear eddy current devices 18 and 16. At this stage, the generator excitation field has not reached a density to enable the generator 24 to produce an adequate amount of power for the front and rear eddy current devices 18 and 16. Preferably, at step 52 the controller 28 activates the battery switch 32 to allow current to flow from the battery 26 to the front and rear eddy current devices 18 and 16.

If step 50 determines that $t_e$ is greater than ramp time X, the method enters a second power interval. In step 54, the controller compares the output voltage of the generator 24 with the voltage of the battery 26 in order to determine whether sufficient electrical power is being generated to operate the eddy current devices while simultaneously charging the battery. If the output voltage of the generator 24 is greater than the voltage of the battery 26, a step 60 occurs. At the step 60, the vehicle is moving at a speed above the specified speed threshold and the generator 24 is able to generate a sufficient amount of power for the front and rear eddy current devices 18 and 16. In addition, surplus energy generated by the generator 24 is applied to the battery 26 for charging.

If the output voltage of the generator 24 is less than the voltage of the battery 26, a step 56 occurs. In step 56, the battery is decoupled from the power rail since there is insufficient surplus power being generated to recharge the battery (i.e., the generator 24 has only enough power to energize the front and rear eddy current devices 18 and 16). Next a step 58 occurs, wherein the friction brake 20 is activated to the extent that the eddy current devices cannot satisfy the demand for braking force. At the step 56, the braking demand requires an amount of power that is greater than the power generated by the generator 24. This power deficit results in a lack of braking power by the front and rear eddy current devices 18 and 16. To compensate for the lack of electromagnetic braking, the friction brake 20 is activated to provide seamless braking for the vehicle. A pass through the loop in the normal mode of operation is completed at step 62.

Figure 4:
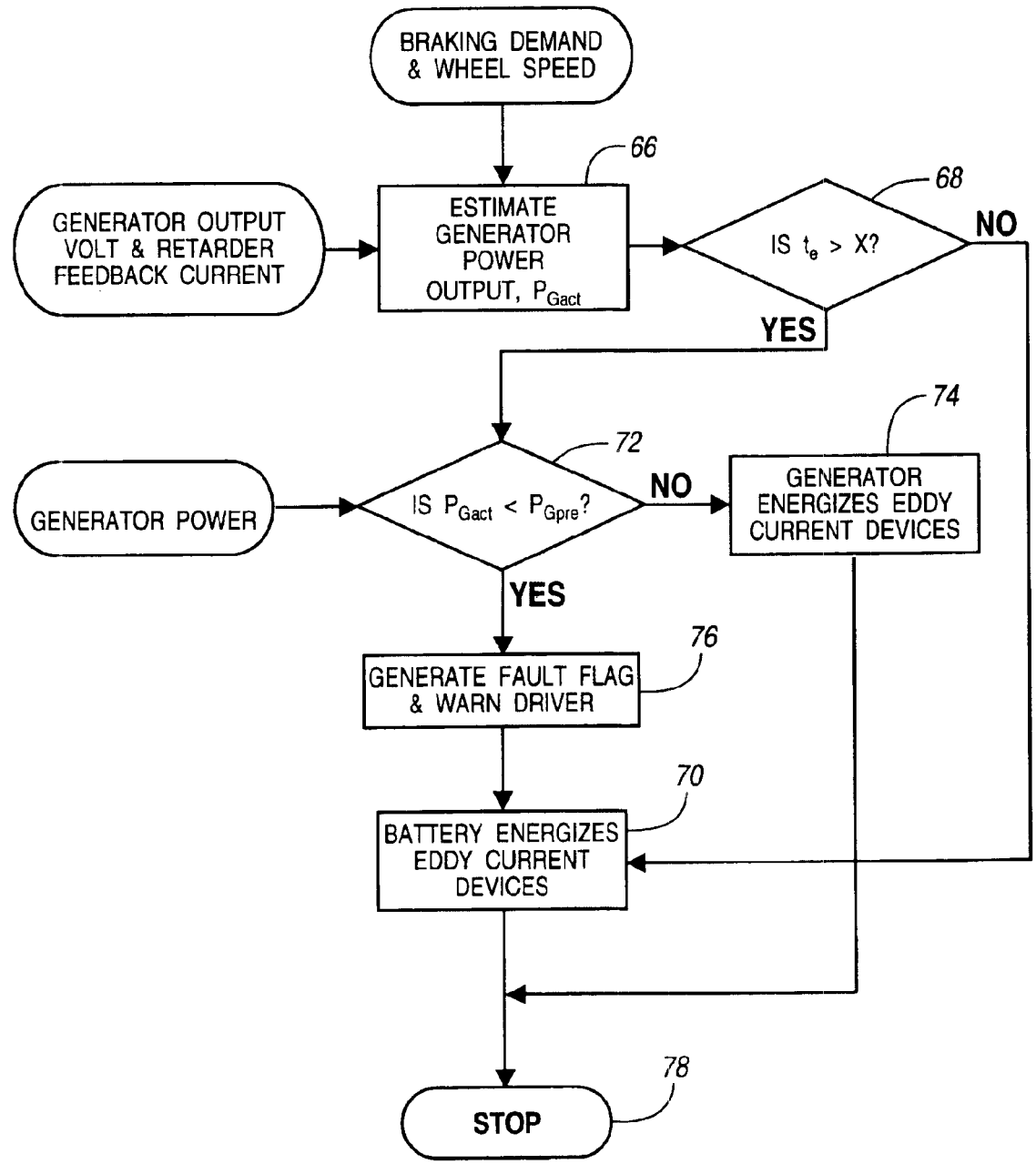
FIG. 4 is a flow chart illustrating a backup mode of operation for an electromagnetic and friction braking system according to the present invention.

FIG. 4 illustrates a power management method for the electromagnetic and friction braking system 10 when a fault occurs within the generator 24. The controller 28 recognizes the generator 24 in fault or power back-up mode when, based on inputs from the power module 40 and the brake sensor 35, the generator 24 is not able to reach a predetermined power requirement. The predetermined power requirement is the amount of power required to energize the front and rear eddy current devices 18 and 16 and achieve the desired braking force. The predetermined power requirement is a function of the braking demand of the vehicle operator. For example, when the vehicle operator presses the brake pedal 22, the controller 28 generates a signal for the front and rear eddy current devices 18 and 16. The front and rear eddy current eddy current switches 34 and 36 are activated to allow the appropriate amount of current to flow from the generator 24 to the front and rear eddy current devices 18 and 16 across the power rail 41. The controller 28 determines an amount of current received by the front and rear eddy current devices 18 and 16 by way of the braking feed back signal through the power line 17. If the braking feed back signal does not correspond to the vehicle operator's braking demand, the controller 28 determines that the generator 24 has not reached the predetermined power requirement and thereafter operates in a power back-up mode.

More specifically, in step 66, the controller 28 receives signals from the brake sensor 35, the power module 40, and the front and rear eddy current devices 18 and 16 to determine an actual power output ($P_{Gact}$) of the generator 24. These signals comprise the vehicle operator's braking demand, the braking feed back signal from the front and rear eddy current devices 18 and 16, a wheel speed sensor signal, and the output voltage of the generator 24. An initial power interval is detected at a step 68 if the elapsed energization time is less than the predetermined ramp time. In step 70, the battery 26 is electrically coupled to the front and rear eddy current devices 18 and 16. Preferably, the battery switch 32 is activated to enable the battery 26 to power the front and rear eddy current devices 18 and 16 across the power rail 41. If it is determined in step 68 that elapsed time $t_e$ is greater than ramp time X, the controller 28 detects a second power interval and determines the predetermined power requirement ($P_{Gpre}$) in step 72. Accordingly, the controller 28 compares the $P_{Gpre}$ with the actual power output ($P_{Gact}$). In the preferred embodiment, the controller 28 compares the actual power output with a percentage of the predetermined power requirement. For example, the controller 28 determines whether the actual power output is greater or less than 50% of the predetermined power requirement. In such a case, a preferred percentage of the predetermined power requirement is dependent on system parameters such as the vehicle's size, weight, and torque capacity of the front and rear eddy current devices 18 and 16. If the actual power output is greater than the predetermined power requirement then a step 74 occurs. In step 74, the generator 24 energizes the front and rear eddy current devices 18 and 16 (either with or without providing surplus power to the battery for recharging). The controller 28 activates the front and rear eddy current switches 34 and 36 to allow current to flow from the generator 24 to the front and rear eddy current devices 16 and 18. If the actual power output is less than the predetermined power requirement, the controller 28 generates a fault signal to alert the driver of a power failure by the generator 24 in step 76. In step 70, the battery switch 32 is activated to enable the battery 26 to energize the front and rear eddy current devices 18 and 16. Since the generator 24 is in a faulted state, the excitation field may be deactivated. Consequently, only the battery energizes the eddy current devices. A step 78 is the end of each loop through the power back-up mode of the method.

Various other modifications to the present invention may occur to those skilled in the art to which the present invention pertains. Other modifications not explicitly mentioned herein are also possible and within the scope of the present invention.

What is claimed is:

1. A braking system for a vehicle having at least one wheel comprising:
   at least one battery capable of receiving and supplying power;
   a plurality of eddy current devices that provide a retarding torque to the wheel of the vehicle when energized;
   a brake pedal sensor;
   a brake pedal having the brake pedal sensor attached thereto;
   a generator driven by motion of said vehicle and capable of supplying power to the eddy current devices and the battery when the brake pedal sensor senses that the vehicle operator has placed the brake pedal in a predetermined pedal position;
   a battery switch for coupling said battery to said eddy current devices and said generator; and
   a controller having memory storage capability, the controller for storing an actual power output of the generator, an elapsed energization time, a predetermined ramp time, and a predetermined power requirement of the eddy current devices, in memory, and receiving inputs from the brake pedal sensor and the generator, and based on memory and in response to inputs from the brake pedal sensor, the eddy current devices, and the generator, the controller generates signals for the battery switch to couple said battery to said eddy current devices.

2. A braking system according to claim 1, wherein the eddy current devices are electromagnetic retarders.

3. A braking system according to claim 1, wherein the plurality of eddy current devices equals 4.

4. A braking system according to claim 1, wherein the generator has an operating voltage of about 42 volts.

5. A braking system according to claim 1, wherein the battery has a voltage of 36 volts.

6. A braking system according to claim 1, wherein the predetermined pedal position of the brake pedal is a depressed position.

7. A braking system control method for a vehicle having a generator with an excitation and output winding therein, a plurality of eddy current devices, and a battery switch for selectably adding battery power into a power module for the eddy current devices, the method comprising the steps of:
   detecting actuation of a braking switch;
   coupling the eddy current devices to the battery for a predetermined ramp time to produce a braking force corresponding to the actuation of said braking switch;
   opening the battery switch after the predetermined ramp time; and
   energizing the eddy current devices by supplying power to the eddy current devices from the generator to continue said braking force.

8. A braking system control method for a vehicle having a generator with an excitation winding and output winding therein, a plurality of eddy current devices coupled to the generator, a battery, a power rail receiving a rectified output of the generator, a battery switch for selectably coupling the battery to the power rail, a controller capable of storing and monitoring the voltage of the generator and the battery and generating control signals for the battery switch, and a friction braking system having a brake pedal, the method comprising the steps of:
   energizing the generator by applying an electric current to the generator excitation winding such that current is generated in the output windings when the brake pedal is activated;
   coupling the battery to the eddy current devices during an initial power interval after energizing the generator;
   decoupling the battery from the eddy current devices at the end of the initial power interval;
   comparing the generator voltage to the battery voltage during a second power interval after the initial power interval;
   if the generator voltage is less than the battery voltage, then activating friction braking and decoupling the battery for as long as the brake pedal is pressed; and
   coupling the battery to the power rail during the second power interval if the generator voltage is greater than the battery voltage.

9. A method according to claim 8, wherein the battery switch is a field effect transistor.

10. A method according to claim 8, wherein the initial power interval comprises a predetermined ramp time.

11. A method according to claim 10, wherein the predetermined ramp time is less than 200 milliseconds.

12. A method according to claim 8, wherein the second power interval occurs after the predetermined ramp time.

13. A braking system control method for a vehicle having at least one wheel, a generator having a excitation winding and a output winding therein, a plurality of eddy current devices capable of providing a braking force and generating a braking feed back signal, and a battery, the method comprising the steps:
   energizing the generator by applying an electric current to the generator excitation winding such that current is generated in the output windings when the vehicle is braking;
   coupling the battery to the eddy current devices during an initial power interval after energizing the generator;
   calculating an actual power output of the generator based on a voltage applied to the generator, the wheel speed, a brake pedal signal based on the position of a brake pedal, and the braking feed back signal;
   generating a fault signal for a vehicle operator and coupling the battery to the eddy current devices when the actual power output is less than a predetermined power requirement during a second power interval after the initial power interval; and
   decoupling the battery from the eddy current devices when the actual power output is greater than the predetermined power requirement during the second power interval.

14. A method according to claim 13, wherein the initial power interval comprises a predetermined ramp time.

15. A method according to claim 14, wherein the predetermined ramp time is less than 200 milliseconds.

16. A method according to claim 13, wherein the second power interval occurs after the predetermined ramp time.

17. A braking system control method according to claim 13, wherein the battery switch is a field effect transistor.

* * * * *